(12) United States Patent
Kasper et al.

(10) Patent No.: US 9,685,830 B2
(45) Date of Patent: Jun. 20, 2017

(54) ELECTRIC MOTOR HAVING AN IRON-FREE WINDING

(71) Applicant: Otto-Von-Guericke-Universitaet Madgeburg, Madgeburg (DE)

(72) Inventors: Roland Kasper, Samswegen (DE); Wolfgang Heinemann, Magdeburg (DE); Norman Borchardt, Giersleben (DE)

(73) Assignee: PATENTVERWERTUNGSGESELLSCHAFT PaLiBa GmbH, Barleben (DE)

( * ) Notice: Subject to any disclaimer, the term of this patent is extended or adjusted under 35 U.S.C. 154(b) by 299 days.

(21) Appl. No.: 14/190,511

(22) Filed: Feb. 26, 2014

(65) Prior Publication Data

US 2014/0217846 A1    Aug. 7, 2014

Related U.S. Application Data

(63) Continuation of application No. PCT/DE2012/000140, filed on Feb. 16, 2012.

(30) Foreign Application Priority Data

Aug. 29, 2011 (DE) .......................... 10 2011 111 352

(51) Int. Cl.
*H02K 3/28* (2006.01)
*H02K 21/14* (2006.01)
(Continued)

(52) U.S. Cl.
CPC ............. *H02K 3/28* (2013.01); *H02K 1/274* (2013.01); *H02K 3/47* (2013.01); *H02K 21/14* (2013.01);
(Continued)

(58) Field of Classification Search
CPC .......... H02K 1/14; H02K 1/274; H02K 21/22; H02K 23/32; H02K 3/28; H02K 3/47; H02K 41/031
(Continued)

(56) References Cited

U.S. PATENT DOCUMENTS 782,312 A    1/1905  Zehden
4,130,769 A * 12/1978 Karube ................. H02K 29/08
                                                310/156.12
(Continued)

FOREIGN PATENT DOCUMENTS

DE    1206067    12/1965
DE    2744145     4/1979
(Continued)

OTHER PUBLICATIONS

International Search Report for PCT/DE2012/000140, mailed Aug. 29, 2013 (6 pages).

*Primary Examiner* — Michael Andrews
*Assistant Examiner* — Rashad Johnson
(74) *Attorney, Agent, or Firm* — Cohen & Hildebrand, PLLC (57) ABSTRACT

An electric motor (1), comprising a primary part (2a, 2b) having an iron-free winding device (3) that comprises at least two phases (6), wherein one phase (6) comprises at least two phase windings (4) and at least one electrical connecting element (5), a secondary part (7a, 7b) having an even number of magnetic poles (8), which are arranged alternatively on the secondary part (7a, 7b), wherein the winding device (3) is arranged in an air gap (9) between the primary part (2a, 2b) and the secondary part (7a, 7b) relative to an axis (10a, 10b), in such a manner that each phase winding (4) of a phase (6) is arranged opposite a respective (Continued)

magnetic pole (8) and all magnetic poles (8) are usable simultaneously for force formation.

21 Claims, 8 Drawing Sheets

(51) Int. Cl.
  *H02K 41/03* (2006.01)
  *H02K 3/47* (2006.01)
  *H02K 23/32* (2006.01)
  *H02K 1/27* (2006.01)
  *H02K 21/22* (2006.01)

(52) U.S. Cl.
  CPC ........... *H02K 23/32* (2013.01); *H02K 41/031* (2013.01); *H02K 21/22* (2013.01)

(58) Field of Classification Search
  USPC ................................................. 310/156, 216
  See application file for complete search history.

(56) References Cited

U.S. PATENT DOCUMENTS

| | | | |
|---|---|---|---|
| 4,211,452 A | 7/1980 | Poubeau | |
| 4,743,813 A | 5/1988 | Tassinario | |
| 4,763,053 A | 8/1988 | Rabe | |
| 4,767,954 A | 8/1988 | Phillips | |
| 4,839,543 A | 6/1989 | Beakley et al. | |
| 4,883,981 A * | 11/1989 | Gerfast | H02K 3/04 310/179 |
| 4,924,125 A * | 5/1990 | Clark | H02K 1/02 310/156.26 |
| 5,001,412 A | 3/1991 | Carter et al. | |
| 5,331,244 A * | 7/1994 | Rabe | H02K 3/04 310/114 |
| 6,800,968 B1 * | 10/2004 | Shikayama | H02K 41/031 310/12.21 |
| 7,109,625 B1 * | 9/2006 | Jore | H02K 21/24 310/198 |
| 7,382,071 B2 | 6/2008 | Morita | |
| 7,777,383 B2 * | 8/2010 | Wilsdorf | F03B 17/061 310/156.38 |
| 7,795,773 B1 * | 9/2010 | Wittig | H02K 21/24 310/179 |
| 7,919,894 B2 * | 4/2011 | Dooley | H02K 1/2786 310/201 |
| 7,986,063 B2 * | 7/2011 | Nakamura | H02K 3/26 29/596 |
| 7,990,008 B2 * | 8/2011 | Yoshida | H02K 3/50 310/112 |
| 2004/0017125 A1 * | 1/2004 | Nakamura | H02K 3/04 310/201 |
| 2009/0072647 A1 | 3/2009 | Hino et al. | |
| 2010/0117367 A1 * | 5/2010 | Muller | H02K 3/47 290/53 |
| 2016/0181893 A1 * | 6/2016 | Shrestha | H02K 11/0073 310/60 R |

FOREIGN PATENT DOCUMENTS

| | | |
|---|---|---|
| DE | 3401776 | 8/1985 |
| DE | 4130016 | 3/1993 |
| DE | 4414527 | 8/1995 |
| DE | 69407908 | 9/1998 |
| DE | 69735825 | 12/2006 |
| DE | 102007048244 A1 | 4/2009 |
| EP | 0519679 | 12/1992 |
| GB | 2455113 A | 6/2009 |
| JP | 56229763 A | 12/1987 |
| JP | H0595644 | 4/1993 |
| JP | 2005192389 A | 7/2005 |
| JP | 2006271056 | 1/2006 |
| JP | 2009071910 | 4/2009 |
| RU | 2328801 C1 | 7/2008 |
| RU | 2424611 C1 | 7/2011 |

\* cited by examiner

ELECTRIC MOTOR HAVING AN IRON-FREE WINDING

This is an application filed under 35 USC §371 of PCT/DE2012/000140, filed on Feb. 16, 2012, claiming priority to DE 10 2011 111 352.9 filed on Aug. 29, 2011.

BACKGROUND OF THE INVENTION (1) Field of the Invention

The invention relates to an electric motor having an ironless winding with externally or permanently excitable magnetic poles.

(2) Description of Related Art

Electric motors are used more and more frequently in many applications. The electro-mechanical energy in such motor is converted either with permanent excitation using permanent magnets or with external excitation using two separate coil arrangements in the rotor and stator, as disclosed for example in DE 69 735 825 T2. Losses occur during this energy conversion, which are essentially composed of ohmic losses, eddy current losses, hysteresis losses and friction losses.

The use of a high number of turns enables high power output, however at the expense of increased ohmic losses. The more winding material is used, the greater is the ratio of mechanical power output to consumed electric power the opposite occurs in generators operation).

The windings are typically constructed of a stator composed of motor iron with slots, in which the individual phase windings are laid or pole pieces, around which the phase windings are wound.

In addition, ironless winding arrangements, for example, embedded in hardened resin or having a self-supporting construction are known from DE 34 017 76 A1 and DE 27 44 145 C1.

Furthermore, slot-less stator designs are known, for example, from DE 69 407 908 12, DE 44 145 27 C1, and DE 69 735 825 T2 C1.

The arrangement of the winding in the air gap between rotor and stator is known, for example, from DE 41 300 16 A1, DE 120 606 7 B, DE 340 177 6 A1, DE 44 145 27 C1, and DE 69 735 825 T2.

Since the magnetic field in the windings of the electric motor varies over time, eddy current losses occur in the form of heat, which is dissipated in the iron parts of the motor. Contemporary electric motors use in part insulated stacks of sheet metal to reduce spreading of the eddy currents. The manufacture of these laminated stators is relatively expensive and these stators are not always offered by the various manufacturers. In addition, permanent-magnet electric motors are increasingly produced which, however, are unsuited for asynchronous motors. A winding can be replaced by employing permanent magnets, thereby reducing ohmic losses and increasing the energy efficiency.

Furthermore, the absolute motor weight and the motor dimensions, both of which are determined by the size and shape of the stator and the rotor as well as the windings, are of great importance for many applications, especially for mobile drive applications.

BRIEF SUMMARY OF THE INVENTION

Against this background, it is the object of the present invention to provide an electric motor with which the aforementioned technical problems of electric motors can be reduced.

This object is attained with an electric motor according to claim 1 and by the further advantageous embodiments recited in the dependent claims.

An electric motor is proposed, which includes at least the following components:
a primary part with an ironless winding arrangement, which has at least two phases, wherein one phase includes at least two phase windings and at least one electrical connection element, and
a secondary part with an even number of magnetic poles which are alternatingly arranged on the secondary part.

The winding device is arranged on the primary part in an air gap between the primary part and the secondary part relative to an axis such that
each of the respective phase windings of one phase is arranged opposite a corresponding magnet pole, and
all magnetic poles can be used at the same time for force generation.

The electric motor can be used as both rotary motor and a translationally operating linear motor.

The term "force generation" refers hereby to both the torque generation in a rotary motor and the equivalent force generation in a linear motor. When current is applied to a conductor in the form of a winding, a magnetic field is generated around this conductor and repels, for example, an opposing permanent magnet, causing a rotary movement in a rotor.

The term ironless winding refers to a winding that has no iron (ferrous material) between the conductors. In contrast thereto, conventional motors have, for example, slots or pole pieces with a corresponding integrated winding.

Advantageously, such an electric motor has lower losses than conventional motors, so a high efficiency can be achieved in combination with a high power density. The relatively small losses are due to a relatively simple motor structure, employing less conductor material and motor iron. The electric motor is characterized by a compact lightweight design that is desirable in particular in the field of mobile drive applications, such as electric mobility.

The winding of the motor is located in the air gap between a stator, which has preferably a slot-less surface, and a rotor for a rotary motor or an armature for a linear motor, which is provided with permanent-magnet poles or separately excited poles. With a rectangular or ring-segment shaped cross-section of the individual winding phases, the phase windings have a shorter side H and a longer side B, which are to be understood as height and width.

According to the invention, the smallest possible air gap between the primary and the secondary part is desired. The largest possible B/H ratio is therefore advantageous for the cross-section of the phase windings so as to make the magnetic flux acting on a conductor as large as possible, thus producing a relatively large magnetic force. Preferred are B/H ratios of between 2 to 100, particularly preferred between 4 and 20. However, all B/H combination are possible, as far as they are technically realizable.

The winding is here arranged in the air gap so that the shorter side H is aligned parallel with the course of the magnetic field lines. In this way, a relatively small air gap can be realized in spite of an integrated winding and thus a relatively high force generation. Winding material include all conductor materials and alloys, such as copper, aluminum, gold, etc.

In one embodiment of the invention, the primary part of the electric motor is a stator, the secondary part is formed as a rotor, the axis is a rotation axis, and the secondary part is arranged on the primary part in parallel to this axis. The iron materials used in the primary and secondary part may include all materials used for the construction of motors.

According to another embodiment of the invention, the primary component of the is formed as a stator and the secondary part as an armature, wherein the axis is a thrust axis and wherein the secondary part is arranged on the primary part perpendicular to the axis. The invention is therefore applicable to both a rotary motor and a translationally operating motor. The physical design is in both two variants based on the same principle of an air gap winding, with the essential difference relating to the support and in the orientation of the force generation.

The magnetic poles of the electric motor can be permanent magnets or externally excitable. Both variants have their pros and cons. Permanent magnet poles attain a much higher flux density in the air gap than externally excited poles, do not require an external power supply, and can be relatively easily integrated into a rotor. Compact permanent magnets have a relatively high inherent weight, but are still are advantageous with respect to the power density, since motors can be designed more compact, and materials can be saved at other places.

All usable magnetic materials, such as for example NdFeB, SmCo, AlNiCo, SrFeBaFe, etc., can be used as permanent magnetic materials. Electromagnets are significantly more advantageously than permanent magnet, but require a coil with an additional current flow, which generates a magnetic field in conjunction with an iron core.

The secondary part can be arranged both inside and outside the primary part. This flexibility allows various design variants for very different applications.

External rotor motors have considerable potential especially with direct drive strategies, for example a wheel hub motor.

The electric motor can also be designed as a direct current motor. Here, the motor has n phases for each pole, where n−1 phases can be simultaneously controlled with a DC voltage. Again, the magnetic poles can be permanent magnets or externally excited and controlled with a DC voltage, for example by using a conventional control method, preferably in the form of block commutation.

In another embodiment of the invention, the electric motor may be designed as an AC current motor, wherein the individual phases can be controlled with an AC voltage having a mutual phase shift of <180°. Conventional control methods, for example sinusoidal commutation, can be used.

At least two phases are required, which are arranged such that a corresponding phase winding of all phases is located under each permanent magnet or externally excited magnetic pole. The more phases are used, the finer is the control of the individual windings, thereby reducing torque ripple.

The motor according to the invention can be operated in both motor mode and generator mode.

In another embodiment of the invention, the primary part of the electric motor is formed as a thin-walled hollow cylinder, preferably with a slot-less surface. This advantageously reduces the total weight because less material is used. The thickness of the hollow cylinder must be dimensioned so as not to cause magnetic saturation of the iron material due to the penetration by magnetic field lines. The bearing of this thin-walled hollow cylinder may be connected by various combinations of materials, wherein the integrity of the motor and the heat dissipation must be ensured.

The stator is made of motor iron and is selected so as to have sufficient strength and an appropriate permeability.

The eddy current losses can be reduced by using conventional methods of lamination of a stator, wherein the very simple geometry of the flux-carrying parts of the stator allow a very simple and cost-effective construction.

The primary part may be formed as a solid cylinder. The feasibility of production, especially with very small production runs, favors that the stator is made as a solid cylinder for manufacturing reasons.

According to the invention, the primary part may have at least one hollow cylinder segment. This design of the stator has the advantage that only a small fraction of a complete stator is needed. Furthermore, it may be advantageous when there is a lack of space, or for weight reduction, etc. to not completely form the stator, but to form the stator as a cylinder segment or as a hollow cylinder segment.

The electrical connection elements provide the shortest possible connection to the $n^{th}$ neighbor, i.e. the $n^{th}$ phase winding, in three dimensions, such that alternating current flows can be realized in the neighboring phase windings of a phase. The term alternating current flows is meant to indicate that the orientation of the current changes between the adjacent phase windings of a phase connected by electrical connection elements. In this way, all magnetic poles, regardless of whether they are permanent magnets or externally excited, can be used for generating a force or a torque. In contrast, while conventional electric motors eventually use all poles, they do not use all poles simultaneously. In addition, the very short connection elements keep resistive losses low, thus increasing the efficiency of the motor.

The magnetic circuit is characterized by a respective thin-wall iron flux path in the primary part and secondary part, by permanent-magnet poles or externally excited magnetic poles, a relatively small air gap and an air gap winding with low number of turns. This magnetic circuit has a relatively low magnetic reluctance and is thus advantageous for generating a relatively large force.

The speed/torque characteristic can be influenced by relatively simple parameter variations, for example, by varying the number of pole pairs, the number of phases and the like. Arbitrary operating points of a motor can thus be defined in a relatively simple manner.

With direct current control of the electric motor, the mutual inductance can be measured by using the n−1 phase, i.e. the zero-current phase, and used for determining the position of the rotor angle. The respective zero-current phase can be used as a position sensor by measuring the induced voltage. The sensor can be constructed for digitally detecting the polarization-reversal point between two adjacent poles as well as for evaluating in analog form the electromotive force (EMF) and for retrograde calculation of the rotor position. This would allow a sensor-less control of speed, torque, current, or position.

With the simultaneous permanent torque generation on all poles, a relatively low torque ripple can be achieved during the operation of the electric motor of the invention.

In a preferred embodiment of the invention, the electrical connection elements may be connected to the phase windings such that the connection elements are alternatingly arranged on the first and second ends of the phase windings. Preferably, the phase windings with the connection elements are arranged in a meander pattern.

The electrical connection elements are connected with the phase windings in such a way that they can be mounted at the level of the respective phase windings, for example in a meander pattern or in a radial direction, i.e. spatially arranged on the rotation axis at different levels, x-y, x-z, y-z.

Advantageously, the electric motor may have a phase winding constructed in several parts and having a cross-section formed as a rectangle or a annular segment. Preferably, the height H of the cross-section is smaller than its width B, wherein the cross-section may be divided into several sections. A multipart construction of the cross-section of the phase winding is meant to indicate that the phase winding is formed by several conductors.

Advantageously, the height H of the cross-section extends parallel to the magnetic field lines in the air gap, so that a relatively small air gap can be realized in spite of the integrated air gap winding.

For a rotary motor, the phase windings of the electric motor are oriented parallel to the rotation axis.

For a linear motor, the phase windings of the electric motor are oriented perpendicular to the thrust axis.

The electrical connection elements can also be used for securing the winding. Advantageously, the phase windings may be secured on the primary part by using the electrical connection elements.

In a further development of the invention, the phase windings together with the electrical connection elements are formed as a single piece.

It is also contemplated that the winding arrangement together with the primary part is formed as a single piece.

The total weight of this electric motor with a thin-walled stator and an air gap winding is relatively low in comparison to conventional motors, since conventional motors have very massive stators with corresponding winding slots or pole pieces.

The phase windings and the electrical connection elements of the motor according to the invention can be produced, depending on the selected materials and material combinations, by the following methods alone or in combination:

Separation methods, such as laser cutting, water jet cutting, punching and the like, Forming process, for example, bending, pressing, casting, deep drawing, turning, grinding, etc.

Joining processes, such as welding, gluing, soldering, etc. and may be constructed in one or more parts, in particular in one or more layers. Moreover, the phase windings and the connection elements may have coatings that, for example, increase the conductivity and can be applied, for example, by spraying, dipping, sputtering and similar coating processes.

The electrical resistance of the electric motor according to the invention is relatively low because the air gap winding has relatively large cross-sections, and overall relatively little winding material is required. Furthermore, relatively short electrical connecting conductors are used between the individual windings of the phases. Due to thin-wall cylindrical ring of the stator, the core losses are lower than in conventional motors, because less iron material is required to produce the cylindrical ring.

The electric motor according to the invention, which is characterized by relatively short winding connections, for example in meander pattern, and a relatively small remaining air gap, has relatively low hysteresis losses, eddy current losses and ohmic losses.

The electric motor according to the invention is also characterized by a very low weight combined with a relatively high power density and is very easy to produce, wherein the dimensions of the primary part, the secondary part, the winding arrangement and the magnet poles can be readily changed.

The proposed electric motor can be used in all fields of application where conventional electric motors are used, and can additionally be used in new fields of application, e.g. in the field of electric mobility, with the invention is not limited to the identified uses and materials and their combinations.

BRIEF DESCRIPTION OF THE DRAWINGS

Exemplary embodiments of the invention are illustrated and described in more detail in the following figures, which show in.

DETAILED DESCRIPTION OF THE INVENTION

Figure 1A:
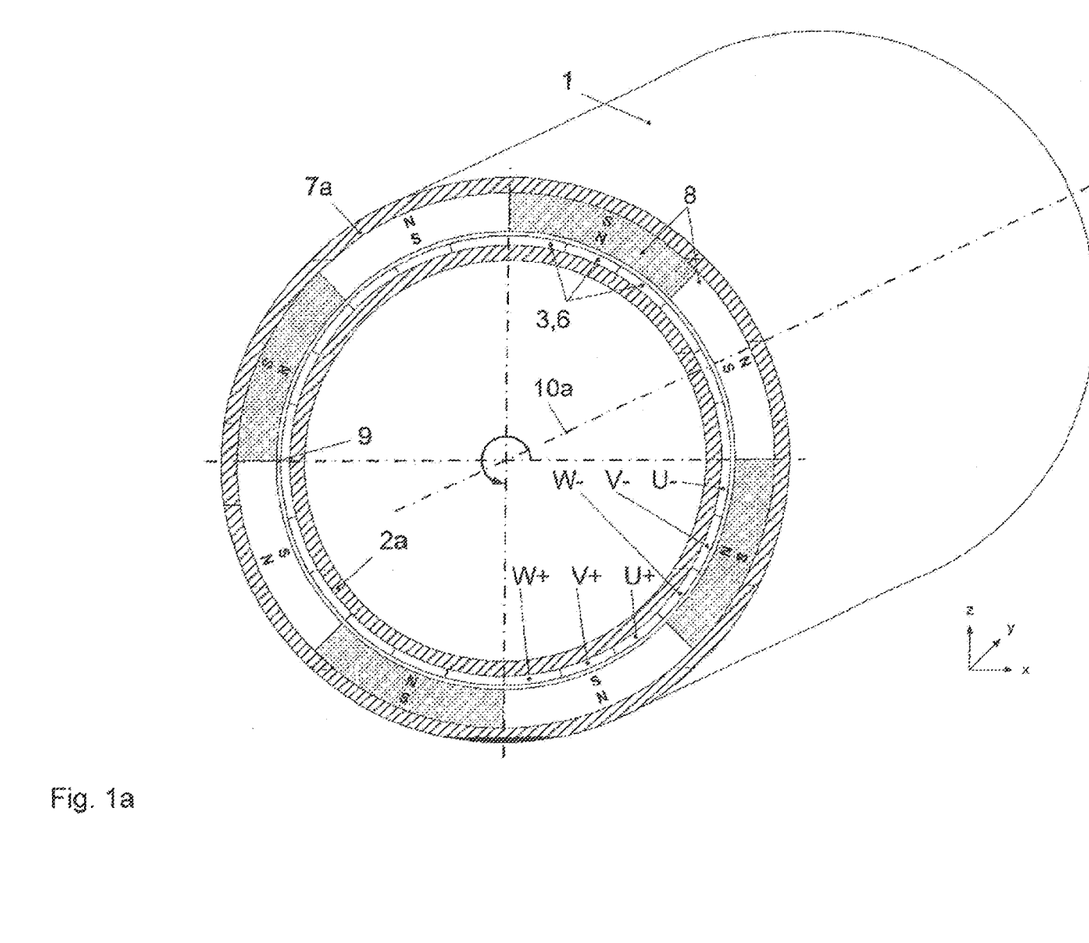
FIG. 1a: schematically, the structure of an electric motor having an external rotor (for example, three-phase winding U, V, W)

FIG. 1a shows schematically the structure of an electric motor 1 with an external rotor, i.e. the primary part 2a and the winding arrangement 3 are located inside the secondary part 7a with the magnetic poles 8. The winding arrangement 3 is here composed of three phases 6, designated with the letters "U", "V" and "W", wherein a phase is composed of several phase windings 4 and electrical connection elements 5 which, although not illustrated in FIG. 1a, are visible in FIG. 2, wherein at least one phase winding 4 of a phase 6 is located underneath a magnetic pole 8 in the air gap 9, in particular in such a way that the phase windings 4 are oriented parallel to the rotation axis 10a, which implies that all magnetic poles 8 are used at all times for torque formation. The magnetic poles 8 are polarized radially in relation to the rotation axis 10a, with the polarization alternatingly changing between the adjacent magnetic poles 8. The primary part 2a and the secondary part 7a are supported on a common rotation axis 10a.

Figure 1B:
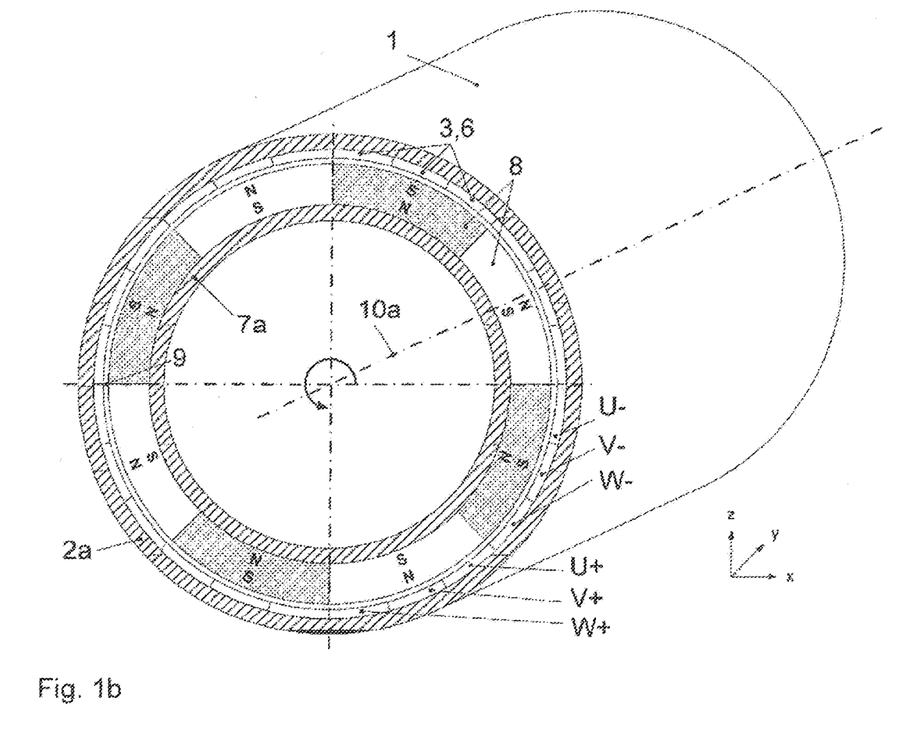
FIG. 1b: schematically, the structure of an electric motor with an internal rotor (for example, three-phase winding U, V, W), FIG. 1c schematically, the structure of a linear motor, FIG. 1d schematically the structure of a hollow cylinder segment, FIG. 2 schematically, the structure of a winding phase.

FIG. 1b shows schematically the structure of an electric motor 1 with an internal rotor, i.e. the primary part 2a and the winding arrangement 3 are located outside the secondary part 7a with the magnetic poles 8. The winding arrangement 3 is here composed of three phases 6, also designated with the letters "U", "V" and "W", wherein a phase is composed of several phase windings 4 and electrical connection elements 5 which, although not illustrated in FIG. 1b, are visible in FIG. 2, wherein at least one phase winding 4 of a phase 6 is located underneath a magnetic pole 8 in the air gap 9, in particular in such a way that the phase windings 4 are oriented parallel to the rotation axis 10a, which implies that all magnetic poles 8 are used at all times for torque formation. The magnetic poles 8 are polarized radially in relation to the rotation axis 10a, with the polarization alternatingly changing between the adjacent magnetic poles 8. The primary part 2a and the secondary part 7a are supported on a common rotation axis 10a.

Figure 1C:
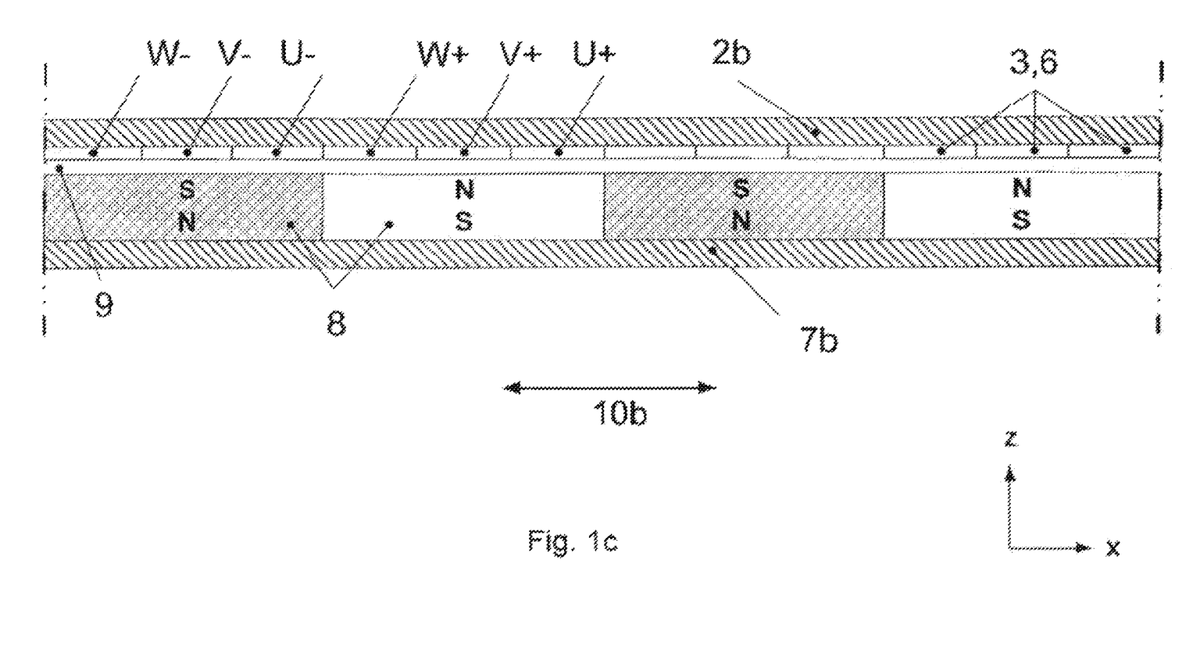

FIG. 1c shows schematically the structure of a linear motor 1, i.e. the primary part 2b and the winding arrangement 3 are located opposite the secondary part 7b with the magnetic poles 8, wherein the secondary part 2b is an armature, but not a rotor as in the rotary motor in FIGS. 1a, 1b. The magnetic poles 8 are polarized radially in relation to the air gap 9, with the polarization changing alternatingly between adjacent magnetic poles 8. The winding arrangement 3 in this embodiment is composed of three phases U, V and W, wherein each phase winding 4 of a phase 6 is located underneath a corresponding magnetic pole 8 in the air gap 9, in particular in such a way that the phase windings 4 are oriented parallel to the thrust axis 10b, which implies that all magnetic poles 8 can be used at all times for torque generation. The primary part 2a and the secondary part 7a are supported on a common thrust axis 10b.

Figure 1D:
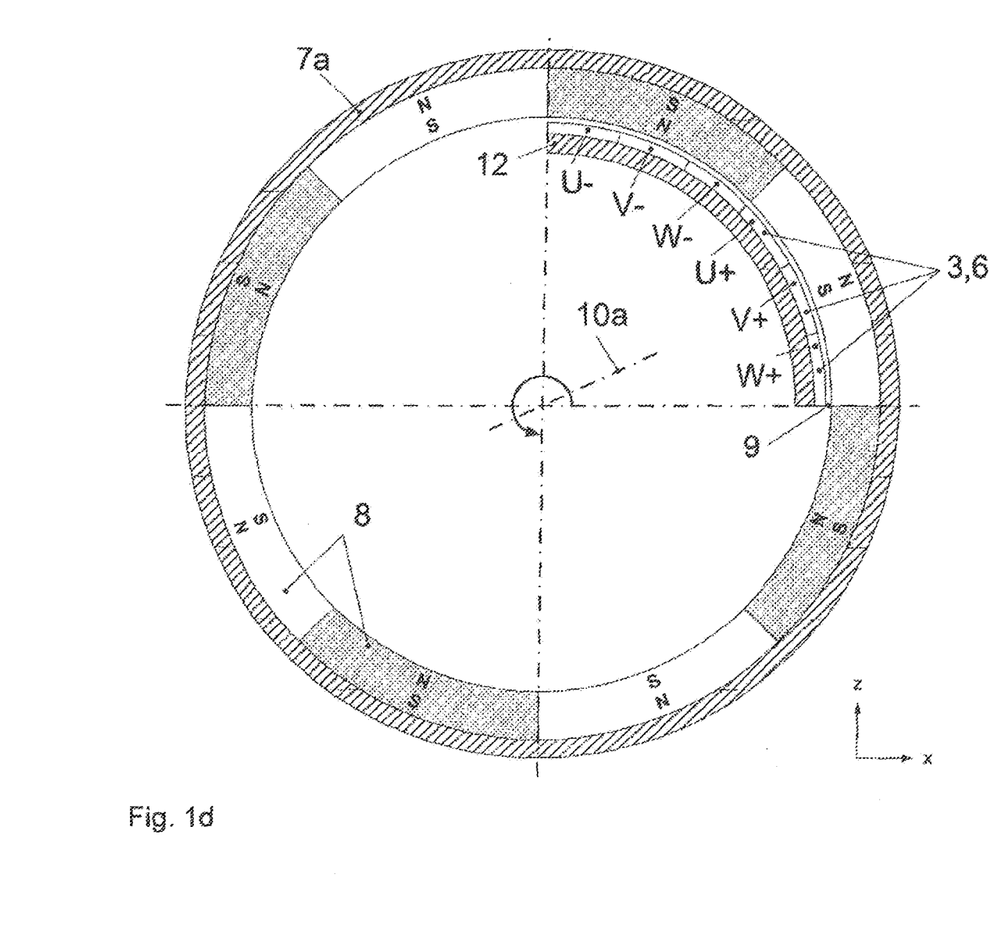

FIG. 1d shows schematically the structure of an electric motor 1 with a hollow cylinder segment 12 for a primary part 2a (not shown) for an external rotor motor, i.e. the primary part 2a and the winding arrangement 3 are located inside the secondary part 7a with the magnetic poles 8, wherein the primary part 2a is not a complete hollow cylinder, but may be formed only as a hollow cylinder segment 12 over at least two magnetic poles 8. The magnetic poles 8 are polarized radially in relation to rotation axis 10a, with the polarization changing alternatingly between adjacent magnetic poles 8. The winding arrangement 3 in this embodiment is composed of three phases U, V and W, wherein a respective phase winding 4 (not shown) of a phase 6 is located underneath a magnetic pole 8 in the air gap 9, but only on the hollow cylinder segment 12, in such a way that the phase windings 4 are oriented parallel to the rotation axis 10a, which implies that all magnetic poles 8 can be used at all times for torque generation. The primary part 2a and the secondary part 7a are supported on a common rotation axis 10a.

Figure 2:
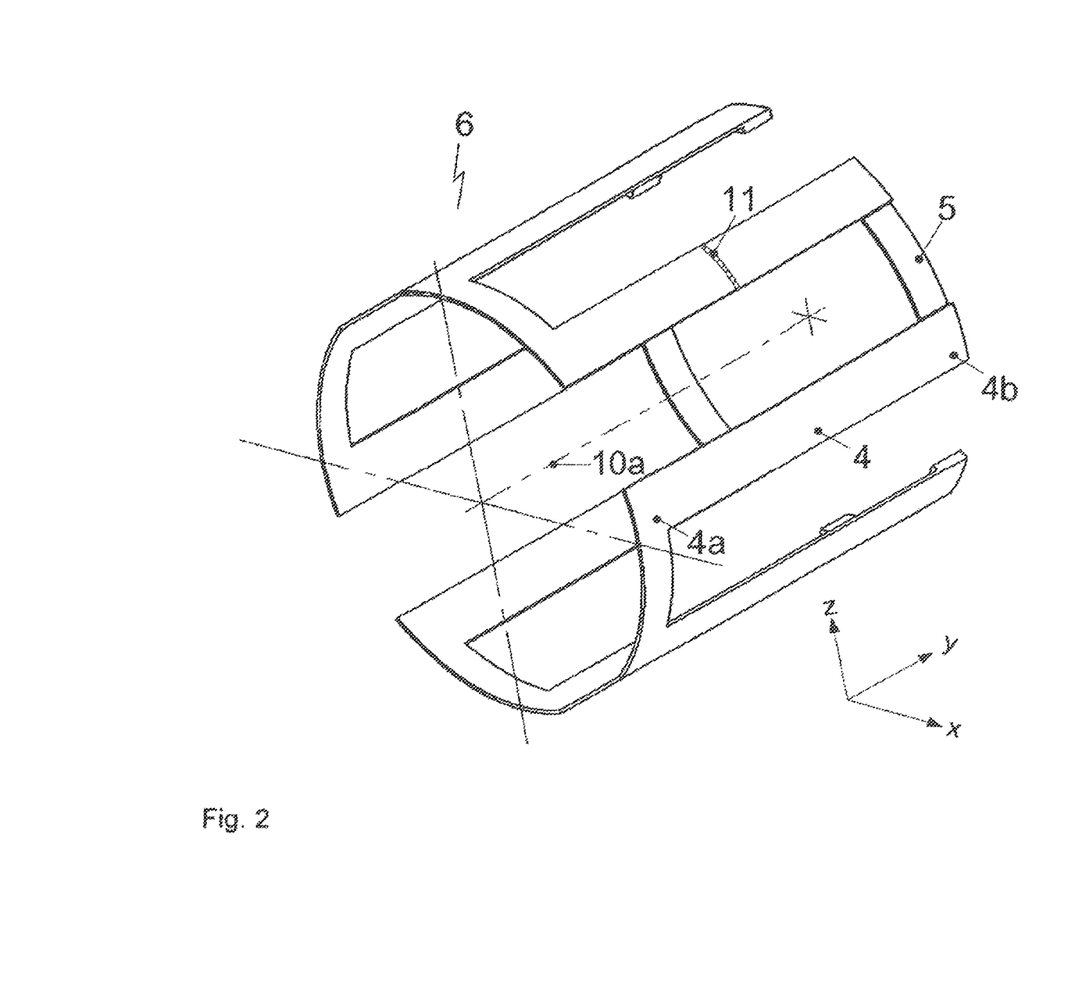

FIG. 2 shows schematically an example of a phase 6 of the winding arrangement 3 (not shown in FIG. 2), for an external rotor motor or internal rotor motor according to FIG. 1a or 1b. It is evident that the phase windings 4 extend parallel to the rotation axis 10a. The cross-section 11 of the phase windings 4 is formed as an annular segment and is made of a solid material. The electrical connection elements 5 may be formed in extension of the phase windings 4 or may be mounted in the radial direction with respect to the rotation axis 10a. The electrical connection elements 5 can be connected to the phase windings 4 using any available joining technique, or the entire phase 6 is made of a single piece, meaning that phase windings 4 and electrical connection elements 5 are made of a contiguous conductor material, which is bent into the desired shape.

Figure 3A:
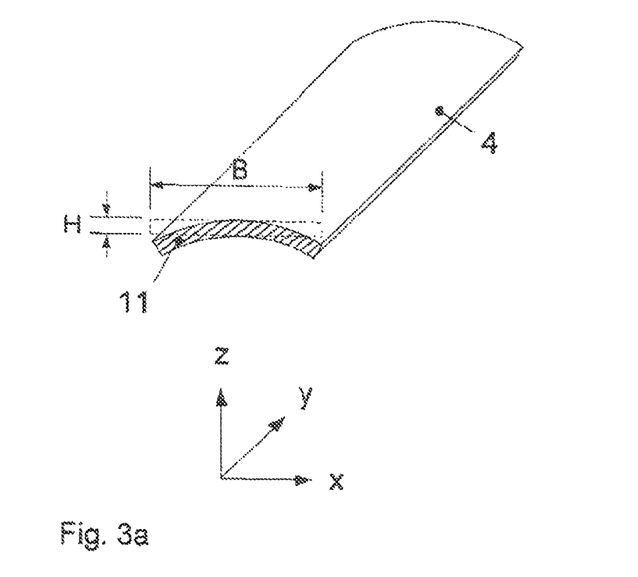
FIGS. 3a and 3b schematic cross-sections of the phase windings.

FIG. 3a shows schematically a cross-section composed of a solid material 11 of a phase winding 4, wherein the cross-section 11 is formed as an annular segment. Here, the height H is several times smaller than the width B.

Figure 3B:
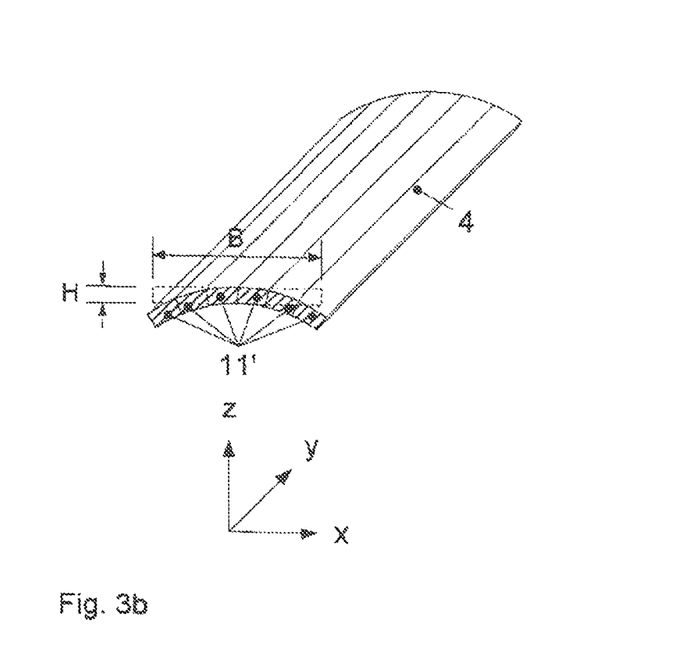

FIG. 3b shows schematically a cross-section 11 of a phase winding 4 composed of several sections 11' and having a height H and a width B.

Figure 3C:
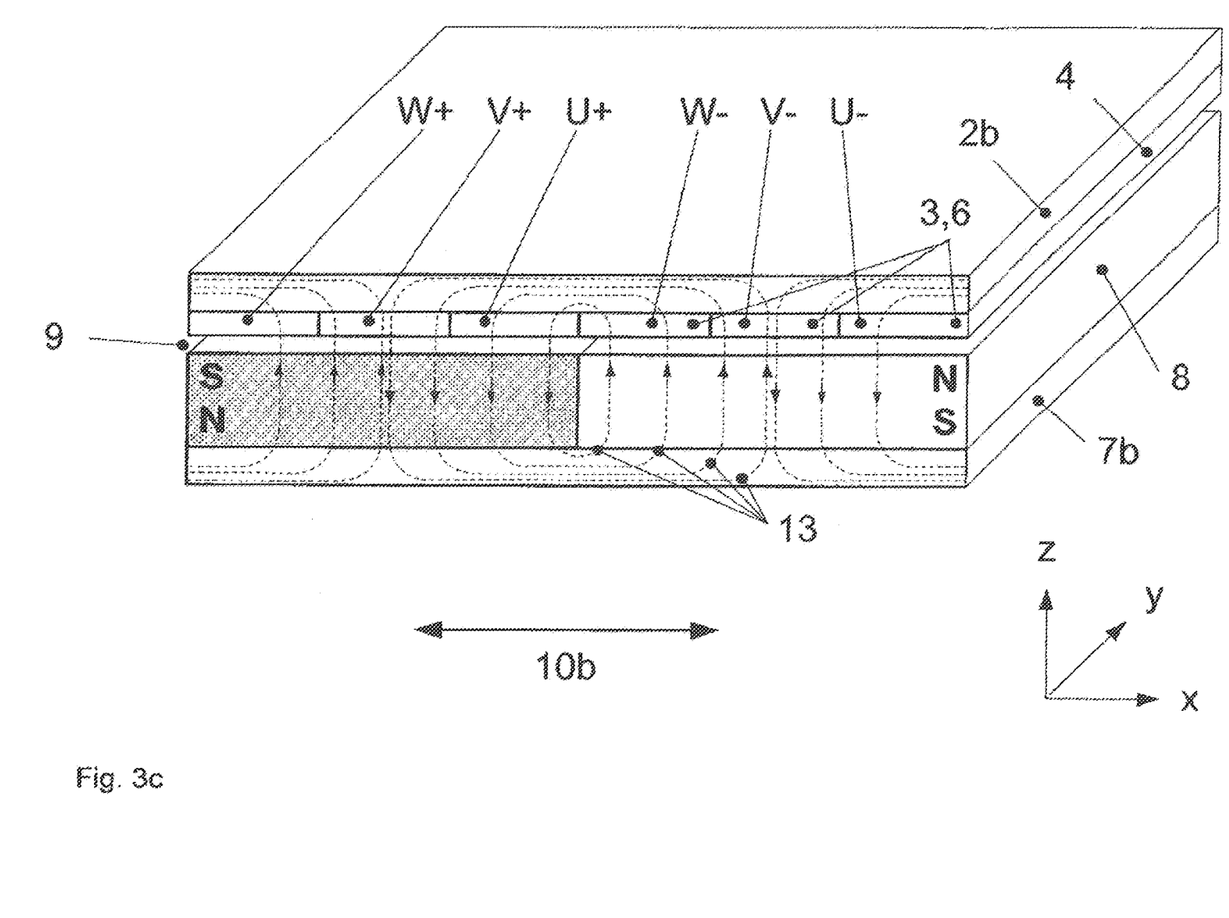
FIG. 3c schematically, the course of the magnetic field lines for a linear motor, and FIG. 4 a detail of the magnetic field distribution in a motor having permanent magnet poles.

FIG. 3c shows schematically the course of the magnetic field lines 13 for a linear motor 1 with an armature 7b having magnetic poles 8, a stator 2b, and winding arrangements 3 arranged on the stator 2b in an air gap 9 between the stator 2b and the armature 7b relative to a thrust axis 10b.

Figure 4:
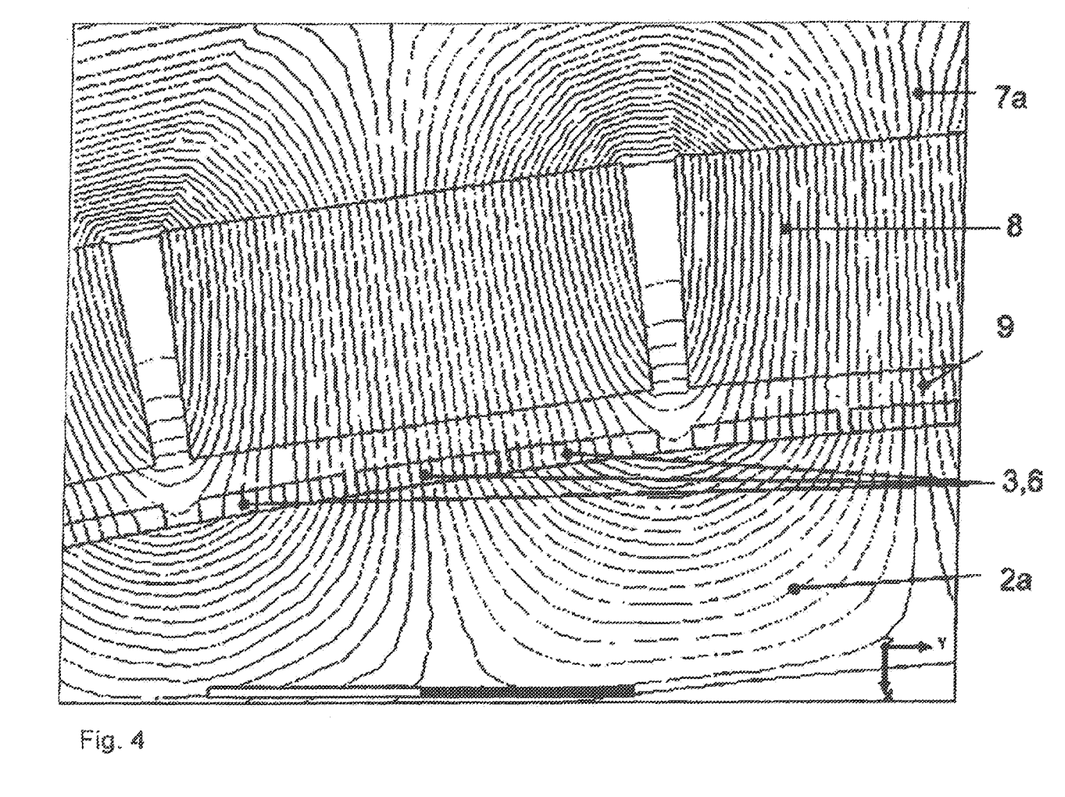

FIG. 4 shows a portion of the magnetic field distribution for a motor with permanent-magnet poles 8, showing more particularly that each magnetic circuit is closed via adjacent magnets and is therefore shortened considerably compared to conventional motors. Due to the reduced resistance caused by the short path of the magnetic flux, the magnetic flux density in the air gap is large compared to the residual flux density of the permanent magnets. In addition, the magnetic stray field is kept small.

LIST OF REFERENCE SYMBOLS

1 Electric motor
2 Primary part
2a Stator rotary motor
2b Stator linear motor
3 Winding arrangement
4 Phase winding
4a First end of a phase winding
4b End of a phase winding opposite the first end 4a
5 Electrical connection element
6 Phase
7 Secondary part
7a Rotor
7b Armature
8 Magnetic pole
9 Air gap
10 Axis
10a Rotation axis
10b Thrust axis
11 Cross-section of the phase windings composed of a conductor
11' Cross-section of the phase windings composed of several conductors
12 Hollow cylinder segment
13 Course of the magnetic field lines

The invention claimed is:

1. An electric motor (1), comprising:
a primary part (2a, 2b) comprising iron materials forming an iron flux path with an ironless winding arrangement (3) having at least two phases (6), wherein each phase (6) comprises at least two phase windings (4) and at least one electrical connection element (5), each of the least two phase windings (4) has a first end (4a) and a second end (4b);
a secondary part (7a, 7b) comprising iron materials forming an iron flux path with an even number of magnetic poles (8) which are alternatingly arranged on the secondary part (7a, 7b), wherein
the winding arrangement (3) is arranged on the primary part (2a, 2b) relative to an axis (10a, 10b) in an air gap (9) between the primary part (2a, 2b) and the secondary part (7a, 7b),
wherein the at least one electrical connection element (5) generates alternating current flows in neighboring phase windings (4) of a phase (6); the at least one electrical connection element (5) is connected to the phase windings (4) of a phase (6) such that the at least one electrical connection element is alternatingly disposed at the first ends (4a) and the second ends (4b) of the phase windings (4),
such that
the respective phase windings (4) of a phase (6) are each arranged opposite a corresponding magnetic pole (8),
a magnetic circuit is formed by the iron flux path in the primary part (2a, 2b) and the secondary part (7a, 7b), the magnetic poles (8), and the air gap (9); the magnetic circuit is closed via neighboring magnetic poles (8),
all magnetic poles (8) are used at the same time for force generation;

and in such a manner that phase windings (4) of different phases (6) are arranged parallel to the rotation axis (10a) and all phase windings (4) have the same length.

2. The electric motor (1) according to claim 1, wherein the primary part is a stator (2a), the secondary part is constructed as a rotor (7a), the axis (10a) is a rotation axis, and wherein the secondary part (7a) and the primary part (2a) are arranged on the common rotation axis (10a).

3. The electric motor according to claim 1, wherein the primary part is a stator (2b) and the secondary part is formed as an armature (7b), the axis (10b) is a thrust axis, and wherein the secondary part (7b) is arranged on the primary part (2b) perpendicular to the axis (10b).

4. The electric motor according to claim 1, wherein the magnetic poles (8) are permanent magnets or externally excitable.

5. The electric motor according to claim 1, wherein the secondary part (7a) is arranged inside or outside the primary part (2a).

6. The electric motor according to claim 1, wherein the electric motor is constructed as a DC motor and has n phases (6) for each pole (8), wherein n−1 phases can be simultaneously controlled with a DC voltage.

7. The electric motor according to claim 1, wherein the electric motor is constructed as an alternating current motor, wherein the individual phases (6) can be controlled with an AC voltage having a mutual phase shift of <180°.

8. The electric motor according to claim 1, wherein the primary part (2a) is formed as a hollow cylinder.

9. The electric motor according to claim 8, wherein the hollow cylinder, has a groove-less surface (7a).

10. The electric motor according to claim 1, wherein the primary part (2a) is formed as a solid cylinder.

11. The electric motor according to claim 1, wherein the primary part (2a) has at least one hollow cylinder segment (12).

12. The electric motor according to claim 1, wherein the electrical connection elements (5) are connected to the phase windings (4) of a phase (6) such that alternating current flows can be generated between the phase windings (4) of a phase (6), which thus generate a force underneath each of the magnetic poles (8) and thus are used at the same time for force generation.

13. The electric motor according to claim 1, wherein the electrical connection elements (5) are connected to the phase windings (4) in such a manner that they are arranged in a meander pattern alternatingly at the first ends (4a) and the second ends (4b) thereof.

14. The electric motor according to claim 1, wherein the electrical connection elements (5) are formed in extension to the phase windings (4) or are arranged in a radial direction with respect to the rotation axis (10a).

15. The electric motor according to claim 1, wherein the phase winding (4) is formed in one or more parts and has a cross-section (11) formed as a rectangle or an annular segment, wherein the height (H) of the cross-section (11) is smaller than the width (B) and the cross-section (11) has one or more segments (11').

16. The electric motor according to claim 1, wherein the height (H) of the cross-section (11) is aligned parallel to the course of the magnetic field lines (13) in the air gap (9).

17. The electric motor according, to claim 1, wherein the phase windings (4) are aligned parallel to the rotation axis (10a).

18. The electric motor according to claim 1, wherein the phase windings (4) are aligned perpendicular to the axis (10b) which is a thrust axis.

19. The electric motor according to claim 1, wherein the phase windings (4) are secured on the primary part (2a, 2b) by the electrical connection elements (5).

20. The electric motor according to claim 1, wherein the phase windings (4) together with the electrical connection elements (5) is formed as a single part.

21. The electric motor according to claim 1, wherein the winding arrangement (3) together with the primary part (2a, 2b) is formed as a single part.

* * * * *